3,401,199
ANILINO-N,N-BIS-PHOSPHORYL HALIDES
Arthur P. Ingram, Jr., Lake Jackson, Tex., assignor to The Dow Chemical Company, Midland, Mich., a corporation of Delaware
No Drawing. Filed May 7, 1965, Ser. No. 454,191
8 Claims. (Cl. 260—543)

This invention relates to new compositions of matter and to the preparation of such compositions. More particularly, the present invention relates to the preparation and use of novel aromatic phosphoryl halides.

Compounds such as phenylamino-N-bis(dichlorophosphine) which contain two trivalent phosphorus atoms bonded to the same nitrogen atom are known (see, for example, Annalen, 595, pp. 193–202, 1955). Heterocyclic compounds in which a single nitrogen atom is bonded to two different pentavalent phosphorus atoms are disclosed in U.S. 3,083,222 to Binder et al. Numerous compounds which contain a single phosphoroxyhalo group bonded to a nitrogen atom are also known (see, for example, Kosolapoff, "Organophosphorus Compounds," pp. 300–302 and p. 306, 1950).

It has now been found that aromatic compounds (referred to herein as aromatic imidophosphoryl halide compounds) which contain two phosphoroxydihalo groups bonded to the same nitrogen atom may be prepared according to the following reaction:

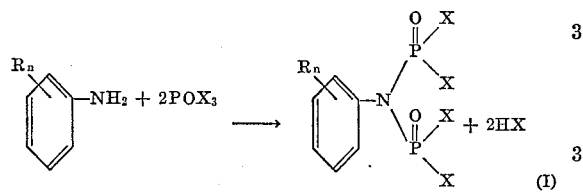

(1)

wherein each X (which may be the same or different) is a halogen (Cl, Br, I, F), $n$ is an integer of from 0 to 5 which represents the number of R substituents bonded to the aromatic ring, and each R is independently selected from the group consisting of a halogen atom, an alkyl, alkenyl, aryl, and alkoxy radical. It is to be understood in reaction (I) that all unsubstituted ring positions are satisfied by hydrogen atoms. Especially suitable substituents include lower alkyl, alkenyl, and alkoxy groups of from 1 to 4 carbon atoms and the middle halogen atoms (chlorine and bromine). When $n$ is 2, two R groups may form a condensed ring. Typical starting amines include aniline, 1-naphthylamine, 3-biphenylamine, metatoluidine, 2,3-xylidine, 2-(3-butenyl) aniline, o-, m-, and p-anisidines and phenetidine, and 2,3,4,5,6-pentachloroaniline. The only necessary chemical characteristic of the starting aromatic amine compound is that the aromatic ring be bonded directly to the amino nitrogen atoms and that the two hydrogen atoms bonded to the amino nitrogen atom be reactive in the presence of excess phosphorus oxyhalide. The phosphorus oxyhalide reactant may be a mixed oxyhalide such as POBrCl₂ POFBr₂, POClF₂, etc. The preferred phosphorus oxyhalide reactants are those in which all of the halogen atoms are middle halogens (Cl or Br). Typical examples of the preparation of imidophosphoryl halides according to the process of the invention include the following reactions:

(1)

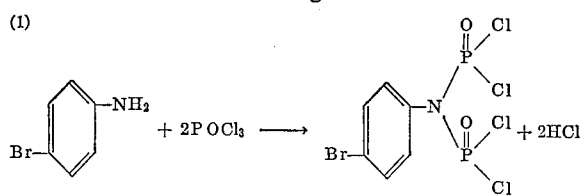

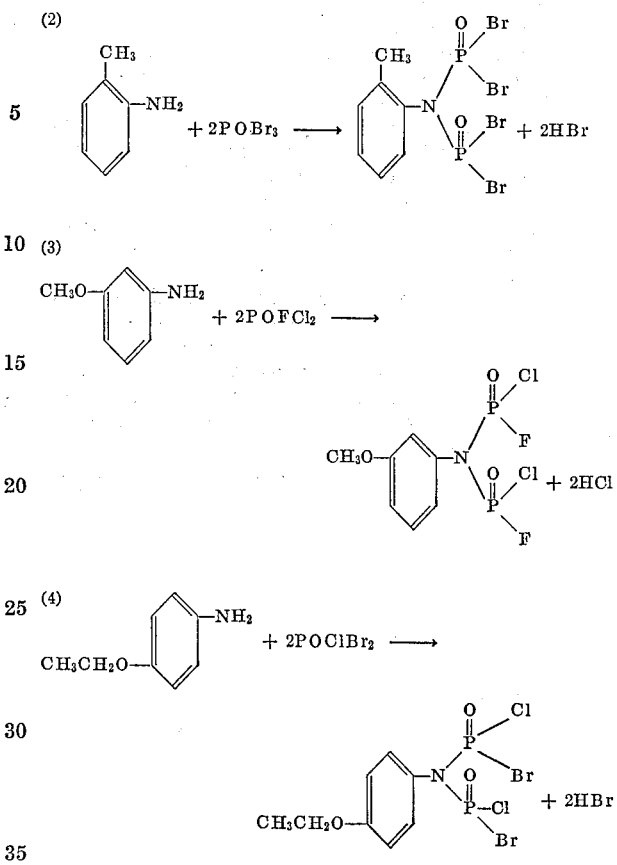

In the above reactions, the valences of carbon atoms without substituents are satisfied by hydrogen atoms. The reactions may be carried out in the presence of a strong base or acid acceptor in order to remove the acid formed during the reaction. Trialkylamines (such as triethylamine) give good results. The reaction may be conducted with or without a solvent. It is generally more convenient to employ an inert solvent such as a liquid hydrocarbon (n-hexane, benzene, toluene, xylenes or similar solvent) as a reaction medium. The reaction temperature suitably may be from 0° to 50° C. (preferably from about 5° to 25° C.) at any pressure of from a few millimeters of mercury to 100–200 atmospheres. The process of the invention is generally carried out under atmospheric pressure at temperatures of from about 5° to 25° C. using at least stoichiometric amounts of phosphorus oxyhalide (at least two moles of phosphorus oxyhalide per mole of primary amine). Under these conditions, mole ratios of phosphorus oxyhalide:primary amine of from 2:1 to 7.5:1, respectively, give good results. The reaction is usually complete within a two hour period, when R contains no more than 10 carbon atoms.

The imidophosphoryl halide compounds of the invention are especially useful as insecticides and in formulating insecticidal compositions. For example, concentrations of at least 2 parts per million of phenylimidophosphoryl chloride in an inert carrier (with or without an adjuvant) were effective in the control of The Plum Curculio pest when used as a contact insecticide.

Curable adhesive compositions (used to prepare laminated wood products) are obtained by combining from .1 to 50 parts by weight of imidophosphoryl halide for every 100 parts of linear polyethylenimine polymer.

The following examples are submitted for the purpose of illustration only and are not to be construed as limiting the scope of the invention in any way.

Example I

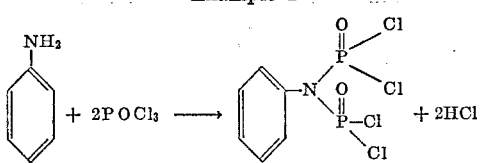

Into a reaction vessel equipped with a means for addition of reactants and temperature control was placed a 765 gram sample of phosphorus oxychloride (POCl$_3$) and a 2000 milliliter portion of benzene. To this mixture (held at 5° C.) was added dropwise a solution composed of 186 grams of aniline and 505 grams of triethylamine in 1000 milliliters of benzene. The addition was completed over a two hour period and the mixture was then warmed to room temperature and the triethylamine hydrochloride formed during the reaction was removed by filtering. The filtrate was evaporated (to remove the benzene solvent) leaving 617.3 grams of reaction product (theoretical yield: 654 grams). A portion of the crude phenylimidophosphoryl chloride was recrystallized once from benzene to give clear crystals of phenylimidophosphoryl chloride (C$_6$H$_5$Cl$_4$NO$_2$P$_2$) with a melting point of 99°–101° C. The chloride content was measured by a Volhard chloride analysis and gave the following results:

| Chlorine: | Percent by weight |
|---|---|
| Found | 43.1 |
| Theoretical | 43.4 |

Phenylimidophosphoryl bromide (C$_6$H$_5$Br$_4$NO$_2$P$_2$) is produced similarly using aniline and POBr$_3$ in place of POCl$_3$.

Example II

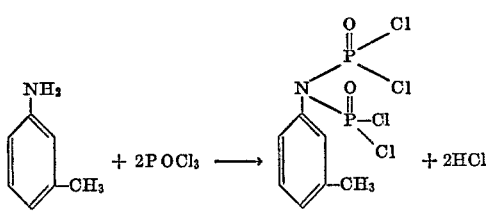

A 46 gram sample of phosphorus oxychloride in 100 milliliters of benzene was placed in a reaction vessel equipped as in Example I. This mixture was held at 10° C. and a mixture of 10.7 grams of meta-toluidine, 22.2 grams of triethylamine and 50.0 milliliters of benzene was added dropwise over a 30 minute period. The resulting reaction mixture was then warmed to 30° C. for a ½ hour period. The mixture was filtered and the solvent was evaporated leaving 33.9 grams of amber liquid meta-tolyl-imidophosphoryl chloride (C$_7$H$_7$Cl$_4$No$_2$P$_2$). The chloride content of the product was 41.2 percent by weight (theoretical chloride content=41.7 percent by weight).

Example III

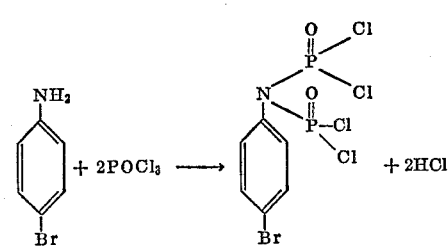

In a manner similar to the preceding examples, a mixture of 86 grams of p-bromoaniline, 105 grams of triethylamine and 100 milliliters of benzene was added dropwise over a 60 minute period to a mixture of 230 grams of POCl$_3$ in 500 milliliters of benzene held at 10° C. The resulting mixture was warmed to 30° C. for one hour, filtered, and the benzene solvent evaporated leaving 169.3 grams of crude p-bromophenylimidophosphoryl chloride (C$_6$H$_4$BrCl$_4$NO$_2$P$_2$). The crude product was recrystallized from a 1:1 (volume) mixture of benzene and cyclohexane giving 45 grams of white crystalline p-bromophenylimidophosphoryl chloride (melting point 96–97° C.).

The aromatic imidophosphoryl halide compounds of the invention are especially useful as cross-linking agents for polyamine polymers containing active hydrogen atoms. Examples of known polymers which may be combined with the compounds of the invention to give curable polymeric compositions include polyalkylenimines such as are disclosed in U.S. 2,272,489, incorporated herein by reference.

I claim as my invention:

1. A compound of the formula

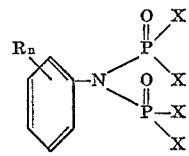

in which each unsubstituted carbon atom is bonded to hydrogen, each X is a halogen, $n$ is an integer of from 0 to 5 representing the number of R substituents, and R is selected from the group consisting of an alkyl, alkenyl, aryl, and an alkoxy group (each group having no more than 10 carbon atoms) and a halogen atom.

2. A compound according to claim 1, wherein each X is a middle halogen.

3. A compound of the formula

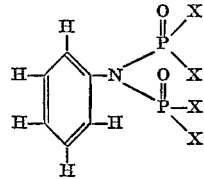

wherein each X is a middle halogen atom.

4. The compound:

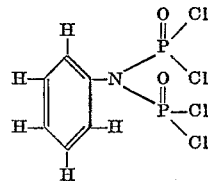

5. The compound:

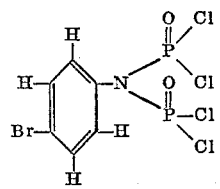

6. The compound:

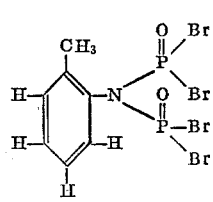

7. The compound:
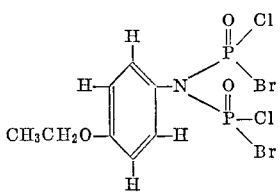
8. The compound:
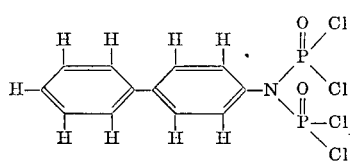
References Cited
UNITED STATES PATENTS
| | | | |
|---|---|---|---|
| 3,121,105 | 2/1964 | McConnell | 260—461 |
| 3,131,207 | 4/1964 | Ratz | 260—461 |
| 2,897,162 | 7/1959 | Lowe et al. | 260—2 |
| 2,901,443 | 8/1959 | Starck et al. | 260—2 |
| 2,754,242 | 7/1956 | Kosolapoff | 167—30 |
| 2,818,368 | 12/1957 | Kosmin | 167—30 |
OTHER REFERENCES
Michaelis, A., Liebig's Annalen der Chemie. Vol. 407. Leipzig, Germany: C. F. Winter'sche Verlagshandluhg. Pp. 290–332 (particularly pp. 306–308 relied upon) (1912).
LORRAINE A. WEINBERGER, *Primary Examiner.*
H. C. WEGNER, *Assistant Examiner.*